Nov. 26, 1946.   W. H. SECKEL   2,411,836
VEHICLE RUNNING GEAR
Filed Nov. 17, 1944   3 Sheets-Sheet 2

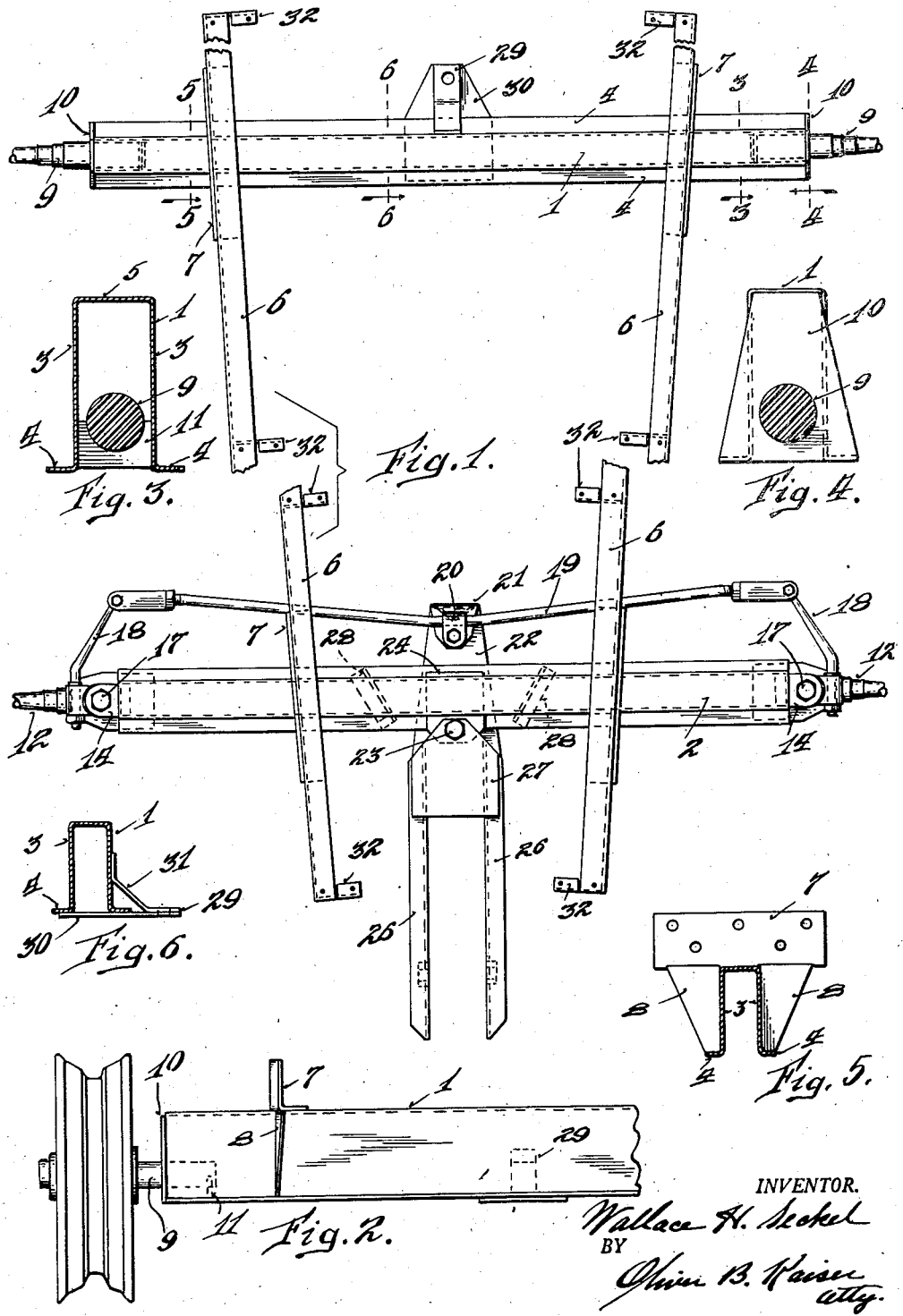

INVENTOR.
Wallace H. Seckel
BY
Oliver B. Kaiser
Atty.

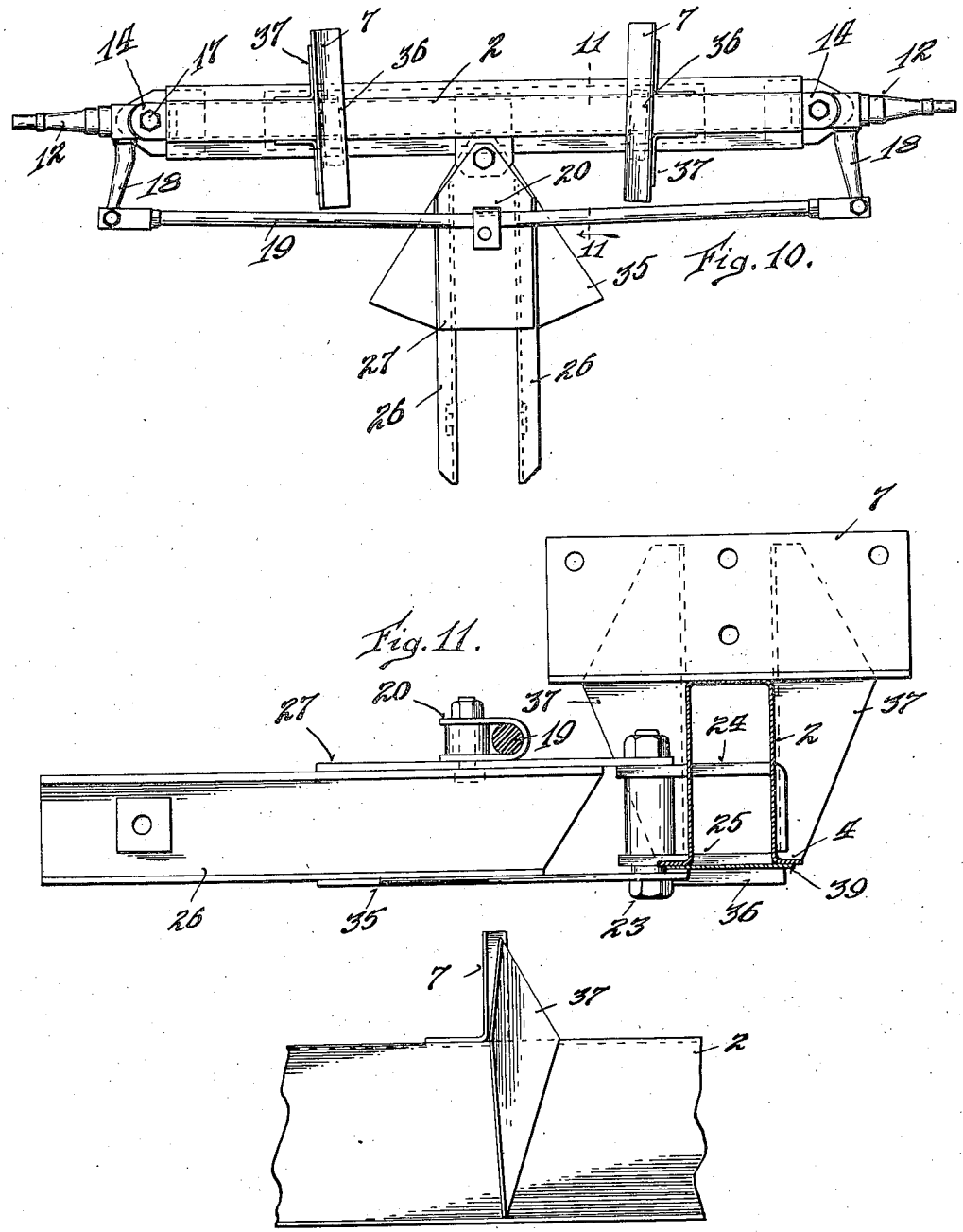

Patented Nov. 26, 1946

2,411,836

UNITED STATES PATENT OFFICE 2,411,836

VEHICLE RUNNING GEAR

Wallace H. Seckel, Galion, Ohio, assignor to The Perfection Steel Body Company, Galion, Ohio, a corporation of Ohio Application November 17, 1944, Serial No. 563,855

5 Claims. (Cl. 280—80)

This invention relates to improvements in all steel running gear of auto-steer type for wagon, truck or trailer service.

An object of the invention is to provide an all steel, four wheel, wagon running gear of auto-steer type of simple and durable construction having the front and rear wheel carrying axles connected by a pair of channel or structural steel bars for direct attachment of a commercial type auto truck carrying platform or body unit.

Another object is to provide an all steel four wheel wagon running gear of auto-steer type, of sturdy structure, capable of yielding without injury in traveling over rough and un-level earth surfaces to render the vehicle particularly of utility in the agricultural field wherein excessive lengths of cargo carrying bodies or platforms are desirable.

Another object is to provide a vehicle running gear having a front and a rear axle with sills mounted and rigidly secured directly upon the axles, the sills flexibly intermediate of their axle connection and correspondingly that of the cargo carrying bed disposed thereon so that they will yield sufficiently without injury thereto under twisting stress due to the wheels traveling over uneven ground to retain all wheels upon the ground.

Another object is to provide the front and rear axles of a vehicle running gear of structural steel formation in cross-section, for weight reduction and increased stability, each having wheel journalling spindles, one respectively fixed to each of the opposite ends thereof and contiguous therewith.

Various other features and advantages of the invention are more fully set forth in the following description of the accompanying drawings forming a part hereof, and illustrating a preferred embodiment, in which:

Figure 1 is a top plan view of the improved four wheel vehicle running gear with the wheels omitted.

Figure 2 is an enlarged side elevation of section of the rear axle.

Figure 3 is an enlarged section on line 3—3, Figure 1.

Figure 4 is an enlarged section on line 4—4, Figure 1.

Figure 5 is a section on line 5—5, Figure 1.

Figure 6 is a section on line 6—6, Figure 1.

Figure 10 is a top plan view of a front axle with a modified form of coupling and wheel steering hitch for locating the wheel spindle steering tie rod at the front side of the axle.

Figure 11 is an enlarged section on line 11—11, Figure 10.

Figure 12 is a side elevation of a section of one of the axles illustrating a modified form of sill attaching bracket fixed thereto.

Figure 7:
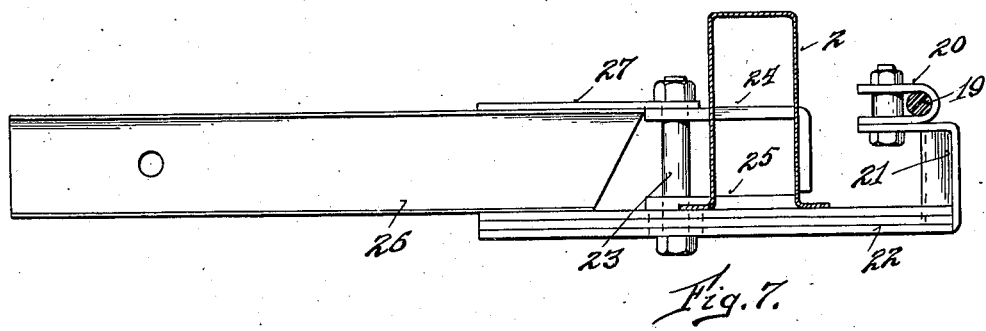
Figure 7 is an enlarged side elevation of a hitch pivotally attached to the front axle and connecting with the wheel spindle connecting the rod.
Figure 8:
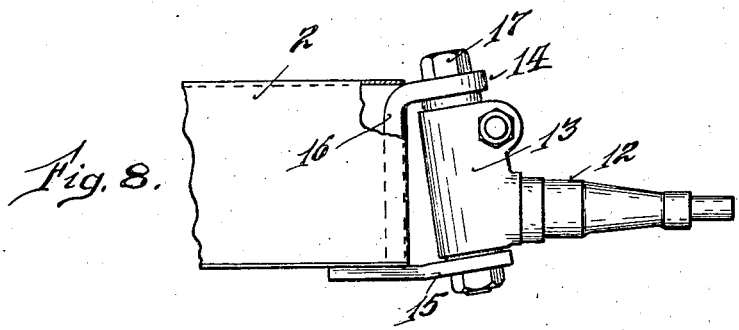
Figure 8 is an enlarged side elevation of an end section of the front axle and swiveled wheel journalling spindle.

The running gear, of four wheel type, primarily comprises a front and a rear axle connected by relatively angularly disposed structural steel sills or beams extending longitudinally of the vehicle, resting upon the upper side of the axles and fixed thereto, for the reception of a commercial auto-truck body, or direct application of a cargo carrying vehicle platform unit convertible into a box-like body by removable sides sustained by stakes engaged into the rim of frame of the platform, to the elimination of bolsters as conventionally employed, one mounted and fixed upon each of the axles respectively. This materially simplifies the structure, reduces its cost as well as giving sturdiness thereto while providing for flex or yield when the vehicle is conveyed over rough ground surfaces, so that its utility is enhanced in an extended length of vehicle for agricultural service. The vehicle may be either animal or tractor drawn to function as a trailer.

Referring to the drawings 1 indicates the rear axle, end 2, of the front axle, which are duplicate construction except for the method of applying the wheel journalling spindles, the spindles for the rear axle being rigid, while for the front are swiveled. The axles are formed from steel plate into a beam of channel or U-shape in cross section with the opposite side walls 3, 3, each terminating with an outward laterally extended flange 4, longitudinal of the full length of the beam. The beam is disposed with its intermediate wall or flange connecting web 5, uppermost and in a horizontal plane to provide a flat surface for resting and sustaining a pair if sills or beams, 6, 6, thereon. The sills 6, preferably are relatively angularly disposed, converging toward each other toward the forward end of the running gear.

The sills are preferably of channel form in cross-section, with the web portion extended vertically or perpendicularly from the top plane of the axle beam, and each is fixed to the front and rear axle beams respectively by an angle form of bracket plate 7, extending transversely across the axle beam and fixed to the outer side of the web of the sill. The flanges of the sill preferably are directed inward of the running gear. The bracket plate 7 is fixed to the axle beam by a pair of tie and brace plates 8, 8, respectively at opposite outer sides of the side walls of the axle beam and extend at a slight inclination therefrom. The anchoring plates 8, therefore, each provides a top edge welded to the underside of the flange of the bracket plate, a side edge abutting and welded to the adjoining wall of the axle beam and a base edge bearing upon and welded to the upper side of the bottom flange of the beam. The bracket with the downwardly extended limbs 8, 8, straddles the axle beam reinforcing and stiffening the same in the lines at which they are connected thereto. The brackets are preferably bolted to the sills to permit ready substitution of different sills, although the method of fastening is optional.

The rear axle 1, at each of its opposite ends, has a wheel journaling spindle 9, fixed therein and protruding therefrom, preferably for a tapering roller bearing of conventional type although its outer end may be of a design for other style of wheel mounting and class of wheel. The inner or stub end of the spindle is of circular contour traversing a beam end closure plate 10, welded to the end of the beam, and having its lower end of a width to span the lateral flanges of the beam, as shown in Figure 4, reinforcing and binding the end of the beam. The spindle stub is welded to the beam end closure plate 10, and extends central inward of the channel of the beam and sockets within and is welded to a segmental cross plate 11, located within the beam as shown in Figure 3, and welded to the opposite side walls thereof.

The front axle 2, at each of its opposite ends is equipped with a pivotally mounted wheel journalling and steering spindle 12, preferably likewise as for the rear wheel spindles for carrying a tapering roller bearing. The inner end of the spindle 12, has a slightly inclined lateral sleeve 13, following the conventional practice for a steering front wheel mounting, which is engaged between a pair of spaced opposing supports or limbs 14, 15, fixed to and projecting from the end of the front axle beam. The upper limb 14, has a stem 16, extending at an angle therefrom, integral therewith and vertically within and gapping the channel of the beam, serving as a cross strut therefor and is welded to the side walls and web of the beam. The second limb 15, spans the base of the beam and exteriorly overlaps the flanges thereof as well as providing a lateral foot plate for the stem of the upper limb. The spindle sleeve is pivotally connected to the limbs 14, 15, by a king pin 17, traversing the limbs and spindle sleeve.

The spindle sleeve is provided with a rearwardly and angularly projecting steering arm 18, having its outer end pivotally connected to the yoke end of a tie rod 19, which joins and connects the steering arms of both spindles for the front wheels. The tie rod is adjustable for proper alignment of the front wheels by means of a threaded connection with the yokes at the extremities of the tie rod.

The tie rod 19, is at the rear side of the front axle and is slightly bowed longitudinally, and centrally of its length is frictionally gripped by yoke shaped clip 20, pivotally mounted upon a bracket 21, fixed to and extending upwardly from a laminated lower or base hitch plate 22, extending across the lower side of the front axle and pivotally connected thereto by a bolt or king pin 23. The bolt 23 traverses a pair of pivot bearing plates or ears 24, 25, in vertical spaced alignment and extends laterally from the front wall of the axle beam, as illustrated in Figure 7. The lower plate 25, extends through the front wall of the axle beam, at the bottom thereof, with its inner end abutting the rear wall of the beam and is welded to the beam. The upper plate 24, is of angle form and extends through the walls of the axle beam with its angled end depending and overlying the adjoining outer side of the rear wall of the beam and welded to the beam.

A pair of channel bars 26, 26, relatively spaced, with their channel side outward are fixed at their rear end to the hitch plate 22, providing a tongue or coupling bar socket. The bars 26, at the upper side and rear end are connected together by a cross plate 27, welded thereto and extend rearwardly therefrom as an ear for making an upper pivotal connection with the axle. The hitch provides for making either a horse pole or tongue connection for animal draft or a stub tongue for a trailing connection.

The swing or arc of movement of the hitch is limited by a pair of angle plates 28, 28, as angularly disposed stops, respectively at relative opposite sides of the lower hitch plate 25, and are fixed or welded to the lower side of the lateral flanges of the axle beam, bridging the channel, and therefore also provide an intermediate reinforcement for the axle beam for added stability.

The rear axle, centrally thereof, is provided with an auxiliary stationary hitch 29. As illustrated in Figures 1 and 6, the auxiliary hitch comprises a plate 30, welded to and extending horizontally from the lower side of the axle beam and is stabilized by a brace 31, having an end parallel with and welded to the upper side of the hitch plate, to laminate the same, and a rear end bent to lie parallel with the rear wall of the beam and to which it is welded. The rear hitch provides a simple and inexpensive adjunct, extremely beneficial in maneuvering a vehicle, as in confined or restricted quarters.

The sills connecting the front and rear axles materially simplifies and reduces the cost of the running gear, over the conventional running gear in which the axles are joined by a reach, braced by hounds fixed to the rear axle and bolsters mounted upon the axles. They are characteristic of a truss to sustain the body or cargo carrying platform against sag under a load disposed thereupon intermediate of its length or between the axles. This permits the use of a body or platform constructed of a lighter weight material for cost reduction, as the load is sustained and distributed along the full length of the sills or at a multiplicity of points therealong to the relief of the platform flooring.

Figure 9:
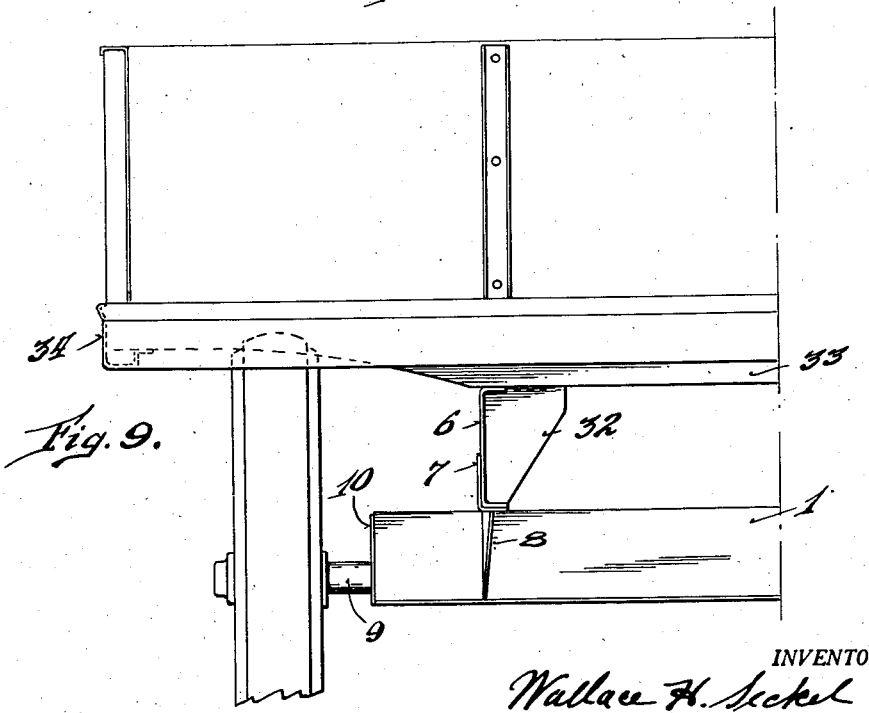
Figure 9 is a rear view of a half section of the running gear with a cargo carrying body applied.

The sills at determined spacing are reinforced and strengthened by combined gusset and brace plates 32, which also serve as attaching means for the platform understructure. Each plate 32, is engaged and snugly fitted into the channel of the sill and welded to the web and flanges thereof. The plate extends outwardly from the sill and has its upper end bent at right-angle to lie in plane with the top flange of the sill for attachment to a bolster 33, as an element of the understructure of the platform and extending cross-wise thereof. The platform may be representative of the bottom structure of a vehicle body or box, or for a combination box and rack. As illustrated in Figure 9, the platform comprises a channel bar frame 34, into which the tapering ends of the bolsters 33, are engaged and fixed, the frame carrying upright sides and ends secured to stakes either permanently or removably carried by the platform frame.

The structure of the platform is separate and apart from the running gear and therefore will not be described in detail herein as it is recognized that the running gear may be equipped with varied types of wagon or truck boxes or a combination box and rack of conventional construction or otherwise.

In the modification of front axle steering hitch or coupling, shown in Figures 10 and 11, the steering arms 18 of the wheel journalling spindles 12, extend forward from the axle, locating the connecting tie-rod 19, which joins the steering arms 18, at the outer or front side of the front axle. This permits the clip 20, for connecting the tie rod to the hitch to be mounted directly upon the upper side of the hitch, to the elimination of the rearward extension, as illustrated in Figure 7, simplifying the construction and reducing its cost, when in some uses of the vehicle there is no necessity to guard the tie rod.

The base plate 35, of the hitch is approximately of triangular outline, thereby providing a pair of corresponding wing-like projections at relative opposite sides of the hitch for an edge engagement against stop blocks 36, fixed to the underside of the beam of the axle, to limit the arc of swing of the hitch and steering control of the front wheels.

As illustrated in Figure 12, the angle brackets 7, for attaching the sills to the axles, each is provided with a pair of spaced companion brace plates 37, of extended and right angular form for increased stability over the plane type shown in Figure 5, and facilitate assembly. Each plate 37, due to its angular form, provides a portion of a flange or limb in parallelism with a side of the bracket and axle beam which it adjoins and a portion lateral thereof to serve as a brace, and for the pair of plates provides a greater area or surfaces for straddling the axle beam. The plates are also of extended length to overlie both the bracket and beam. One flange or limb of the plate overlies a relative parallel side of the beam, with a portion thereof extending upwardly beyond the beam, providing a brace for the bracket 7. Alternately the second flange has its lower portion at an angle to the side wall of the axle beam as a brace for the wall and bracket bearing against and joining to the laterally extended flange at the bottom of the beam while its upper portion lies in parallelism with the perpendicular flange of the bracket 7, to which it is secured. The plates 37, therefore reinforce both the bracket and axle beam at their union against flex or bend under tortional strain resulting from any twisting flex of the sills intermediate of their connections with the axles, resulting from transporting the vehicle over extremely rough ground, to avoid raising any one of the wheels from the ground. With the sills mounted and fixed directly upon the axles, there is no provision for keeping all of the wheels upon the ground, except the flexibility of the sills and bed. The sills therefore cannot be too stiff and must be capable of flex without injury. This therefore is at variance from the conventional practice and a departure aiding materially in simplifying the structure of the running gear and for a reduction in cost. In instances where the vehicle is transported over extremely rough ground severe torsional stresses are imposed upon the sills at the points of connection with the axles. The reinforced method of connection offers ample stability without permitting the connected parts to be weakened, bent or disrupted, so that the sills will readily readjust themselves to the ground surface conditions without injury to any part of the running gear. As no displacement or deformity is possible at the sill and axle connections the flexibility of the sills between the axles readily accommodates for rough and uneven ground conditions without impairment to the sills. In this connection the cross-sectional form of the beam of the axle need not necessarily conform to the embodiment as herein exemplified and may follow other patterns. However, the beam construction as exemplified, offers the necessary stability aside from facilitating in rigidly and efficiently connecting the sills to the axles as well as for joining or applying other components thereto. The opposite extending flanges for the bottom of the beam reinforce its structure so that the beam can be made of a comparatively light gauge of sheet steel and having an open channel at its lower or bottom side, permits the embodiment of the stocks for mounting and sustaining the wheel journalling spindles within opposite ends of the beams and to extend the spindles contiguous therefrom. The beams are of duplicate design for both front and rear axles and the stocks also serve to reinforce and strengthen the ends of the beams.

The beams can also be readily further reinforced by a plate 39, across and extending longitudinal of the beam, to extend slightly beyond the points of attachment of the sills and is fixed to the bottom flanges and gaps across the channel.

Having described my invention, I claim:

1. A vehicle running gear, comprising: a front axle and a rear axle, said axles, each of channel beam form in cross-section and having its opposite side walls, each terminating with a lateral outwardly extended flange, a pair of sills extending longitudinally of the running gear resting upon and fixed to said axles and brackets connecting said axles and sills, each respectively at an intersection thereof, each bracket having a plate section extending transversely across the top of the axle in parallelism with and connected to the sill and a pair of brace wings depending from the plate section and extending laterally each respectively from a relative side of the axle and permanently fixed thereto.

2. In a vehicle running gear, a front axle and a rear axle, said axles each of channel beam form in cross-section and having its opposite side walls each terminating with a lateral outwardly extended flange for the bottom side of the beam, sills extending longitudinally of the running gear intersecting and upon the axles, and brackets connecting said axles and sills, each respectively at an intersection thereof, each bracket having a section thereof extending transversely across the top of the axle in parallelism with and connected to the sill and wings depending from said section and laterally from the opposite sides of the axle with the lower portion thereof abuttingly upon the lateral flanges of the axle.

3. In a vehicle running gear, a front axle and a rear axle, said axles each of channel beam form in cross-section having its opposite side walls each terminating with a lateral outwardly extended flange for the bottom side of the beam, a pair of sills extending longitudinally of the running gear and mounted upon said axles and means for rigidly securing the sills to each axle consisting of an angle plate extending cross-wise of the axle having a flange thereof underlying the sill and a second flange in parallelism with a side of the sill and secured thereto and a pair of wings depending from said angle plate straddling the axle and abutting the bottom flanges thereof, all welded to the axle.

4. In a vehicle running gear, a front axle, a rear axle, a pair of sills extending longitudinally of the running gear mounted upon said axles, a bracket of angle form for connecting a sill to an axle, having a flange underlying the sill and fixed to the axle and a second flange in parallelism with a side of the sill and secured thereto and a pair of plates of angle form fixed to the bracket and axle and disposed at relative opposite sides of the axle, each plate having a portion in parallelism with a surface of the axle and bracket which it adjoins and secured thereto and a second portion at angle thereto.

5. In a vehicle running gear, a front axle, a rear axle, a pair of sills extending longitudinally of the running gear mounted upon said axles, and a pair of plates of angle form fixed to the sill and axle and disposed at relative opposite sides of the axle, each plate having a portion in parallelism with a surface of the axle and sill which it adjoins and secured thereto and a second portion at angle thereto.

WALLACE H. SECKEL.